United States Patent Office 3,479,139
Patented Nov. 18, 1969

3,479,139
PURIFYING PHOSPHORIC ACID
Ernest L. Koerner, Jr., Oklahoma City, Okla., assignor to Monsanto Company, St. Louis, Mo., a corporation of Delaware
No Drawing. Continuation-in-part of application Ser. No. 442,801, Mar. 25, 1965. This application May 1, 1968, Ser. No. 725,905
Int. Cl. C01b 25/18
U.S. Cl. 23—165
13 Claims

ABSTRACT OF THE DISCLOSURE

A process is described for purifying phosphoric acid with respect to iron impurities by reducing trivalent iron impurities contained in the phosphoric acid to the divalent oxidation state and contacting the phosphoric acid containing the reduced iron impurities with a water-insoluble amine extractant in amounts sufficient to extract the phosphoric acid and form a water-insoluble extractant phase comprising the amine and the phosphoric acid.

---

This invention is a continuation in part of U.S. patent application 442,801, filed Mar. 25, 1965, now abandoned.

This invention pertains to a process for purifying phosphoric acid with respect to iron impurities and, more particularly, to a process for separating phosphoric acid from trivalent iron impurities contained in said acid as well as obtaining phosphate values purified with respect to iron impurities.

It is well-known that phosphoric acid produced by the widely used commercial wet method contains impurities such as silicon, calcium, arsenic, iron, fluoride, aluminum, chromium, vanadium, lead and the like which often require separation to some degree from the wet phosphoric acid prior to its intended use. For example, such phosphoric acid requires some degree of purification with respect to iron present in the acid as essentially trivalent iron impurities when the acid or its salts and derivatives thereof are intended for use in food chemicals, pure chemicals, detergent compositions and the like. Certain organic amines are useful as extractants for purifying phosphoric acid by extracting the phosphoric acid from such metallic and/or cationic contaminants as aluminum, chromium, vanadium, lead and the like. However, in some cases trivalent iron appears to be extracted to an objectionable degree with the phosphoric acid into the organic amine extractant phase. This results in the phosphate values, obtained from stripping the organic amine extractant, containing iron impurities. As can be appreciated, therefore, a method for separating phosphoric acid from trivalent iron impurities contained in said acid utilizing an organic amine egtractant would represent an advancement in this art.

It is, therefore, an object of this invention to provide an improved process for purifying phosphoric acid with respect to iron impurities.

It is another object of this invention to provide a method for separating phosphoric acid from trivalent iron impurities contained therein.

It is another object of this invention to provide a process for extracting, by use of an organic amine extractant, phosphoric acid from iron impurities contained in said acid.

It is another object of this invention to provide an improved process for obtaining phosphate values purified with respect to iron impurities.

It is still another object of this invention to provide in a preferred embodiment a process for purifying phosphoric acid with respect to iron impurities which would enable its use, as well as the salts and derivatives thereof, in food chemicals, pure chemicals, detergent compositions and the like.

These and other objects will become apparent from the detailed description hereinafter.

This invention, in general, pertains to a process for purifying phosphoric acid with respect to trivalent iron impurities which comprises reducing the trivalent iron impurities to the divalent oxidation state and extracting the phosphoric acid from the reduced iron impurities by use of a water-insoluble organic amine extractant. Additionally, if desired; phosphate values still further purified with respect to iron impurities can be recovered from the loaded organic amine extractant by stripping said extractant in the presence of an iron-complexing agent. All of the foregoing will be more fully discussed hereinafter.

As used herein "wet" phosphoric acid means phosphoric acid produced by the wet method which essentially entails the acidulation of phosphate rock by the use of sulfuric acid. The phosphate rock raw material can, of course, vary depending on, inter, alia, the source from which it is mined and is usually obtained from such deposits as those located in Florida and the western states, such as Idaho. Although the extractant methods of the present invention do not appear to be dependent on the concentration of the wet phosphoric acid, it is preferred, however, that the acid be concentrated, i.e. containing less than about 80% water by weight, with an acid containing from 10 to about 70% water by weight being especially preferred.

In general, any method which can reduce trivalent iron impurities contained in phosphoric acid to the divalent oxidation state is suitable, and, in particular, can include such methods as the use of reducing agents and/or electrolytic reduction.

Reducing agents which are suitable for use in the process of the present invention are those which, in general, are capable of reducing the trivalent iron impurities in a phosphoric acid medium to the divalent oxidation state. In particular, reducing agents which are suitable have a standard oxidation potential greater (more positive) than that for the oxidation of $Fe^{++}$ to $Fe^{+++}$, that is,

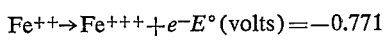

and do not, to any detrimental extent, react with the phosphoric acid to liberate hydrogen, that is, for example,

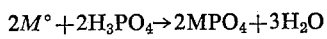

where M is a metal having a stable trivalent oxidation state in a phosphoric acid medium or react with phosphoric acid and/or any impurities contained therein and thus interfere by, for example, precipitation, with its reducing capability.

The reducing agents suitable may be either metallic or non-metallic reducing agents. Such metallic reducing agents include lithium, potassium, rubidium, cesium, calcium, sodium, cerium, magnesium, aluminum, vanadium, chromium, iron, cobalt, tin, copper, nickel and the like with magnesium, aluminum, copper and iron being preferred and iron being especially preferred. Additionally, non-metallic reducing agents include hydrogen gas, formic acid, formaldehyde, sulfurous acid, nitrous acid, methyl alcohol, hydrogen cyanide, iodine, borohydrides and the like.

With respect to electrolytic reduction, any conventional electrolysis apparatus can be used which, in general, includes a suitable container for holding the wet phosphoric acid, a pair of electrodes (cathode and anode) which are placed in the wet phosphoric acid with the cathode and anode preferably separated a suitable distance from each other and a direct current voltage source (battery) connected in series with the cathode and anode through suitable electrical leads with the battery generating an electrical potential between the cathode and anode. The electrodes are usually platinum, although other metals may be employed in some instances. The battery can be of any conventional size which is capable of generating the required electrical potential for conducting the reactions at the electrodes. U.S. Patent 2,288,752 describes another type of electrolysis apparatus which can be used.

The reactions at the cathode and anode can be written substantially as follows:

(1) Cathode Reaction:

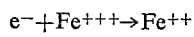

(2) Anode Reaction:

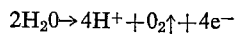

The overall reaction occurring in the electrolysis cell can be written either in ionic form or molecular form as follows:

(1) Ionic Form:

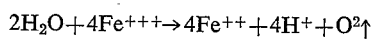

(2) Molecular Form:

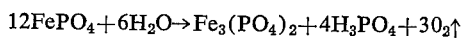

It is oftentimes advantageous for the anode to be provided with a porous membrane or cup surrounding it in order to minimize the possibility of the product formed at the anode ($O_2$) from oxidizing the product formed at the cathode ($Fe^{++}$) back to its original state ($Fe^{+++}$).

In general, it is usually desired to reduce substantially all of the iron present in the phosphoric acid as trivalent iron impurities to the divalent state, that is, amounts of trivalent iron impurities greater than about 50% by weight of the total trivalent iron impurities contained in the phosphoric acid. When using reducing agents the reduction can be conducted by contacting the wet phosphoric acid with the reducing agent for a period of time sufficient to reduce the trivalent iron impurities to the divalent oxidation state. Usually amounts of reducing agent, particularly metallic reducing agents (e.g. iron and the like), are sufficient when used in about stoichiometric amounts, although amounts in excess of stoichiometry of from about 10% to about 1000% are preferred although amounts in excess of 1000% can be used, if desired.

In general, any organic amine compound which is water-insoluble and/or capable of forming desired water-insoluble salts can be used in the present invention and especially organic mono-amine compounds. In particular, organic amine compounds containing a terminal polar nitrogen-containing group and at least 2 hydrophobic substituent groups, such as those compounds derived from fatty acids of varying molecular weights and different degrees of saturation, are suitable for use. A suitable amine may be secondary or tertiary amines as well as quaternary ammonium compounds. Those secondary and tertiary aliphatic amines having 2 substituent groups, each containing from about 7 to about 15 carbon atoms, and including branched chain structures as well as straight chain structures, are quite suitable for use in the present invention. Mixtures of amines are suitable when containing to a predominant extent the foregoing structures. Tertiary aliphatic amines in which the third substituent group contains less than about 18 carbon atoms are also quite suitable for use in the present invention. Other amines can be used although, in general, they are less suitable. For example, primary aliphatic amines exhibit an undesirable tendency to precipitate as the amine salts when in contact with wet phosphoric acid. The secondary or tertiary aliphatic amines containing less than about 7 carbon atoms on each of at least 2 substituent groups exhibit the undesirable tendency to be water-soluble. The secondary or tertiary aliphatic amines containing more than about 15 carbon atoms on each of at least 2 substituent groups exhibit the undesirable tendency to form salts which are relatively insoluble in the extractant phase. In addition, aromatic amines, whether primary, secondary, or tertiary are less suitable because they exhibit such undesirable tendencies as relatively poor salt solubilities and relatively poor extracting capabilities.

It should also be noted that quaternary ammonium bases are suitable for use as extractant in the present invention. In general, all of the foregoing relating to the tertiary amines is applicable to quaternary ammonium bases. The fourth substituent aliphatic group attached to the nitrogen may contain any number of carbon atoms but preferably should not contain over about 15 carbon atoms.

The term "water-insoluble" as used herein with respect to the amines including the quaternary ammonium compounds, does not necessarily require complete insolubility. It merely requires that the material be sufficiently immiscible with the wet phosphoric acid phase to allow physical separation of the liquids into two distinct phases.

The preferred amines useful as extractants are long chain hydrocarbyl amines of the following formula (1)

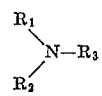

Wherein $R_1$ and $R_2$ are members selected from the class consisting of saturated and ethylenically unsaturated aliphatic hydrocarbyl groups containing from about 7 to about 15 carbon atoms and $R_3$ is a member selected from the class consisting of hydrogen and saturated and ethylenically unsaturated aliphatic hydrocarbyl groups containing from 1 to about 18 carbon atoms.

The preferred quaternary ammonium compounds useful as extractants are long chain hydrocarbyl quaternary ammonium compounds of the following formula:

(2)

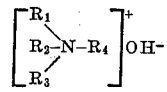

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated aliphatic hydrocarbyl groups containing from 1 to about 18 carbon atoms, and $R_4$ is a member selected from the class consisting of saturated and ethylenically unsaturated aliphatic hydrocarbyl groups containing from 1 to about 15 carbon atoms.

In addition, it should be noted that the salts of the foregoing amines and ammonium compounds can be used in the instant invention as the amine extractant. In general, the amine and ammonium salts can be formed from many organic and inorganic acids and preferably those acids which are stronger than phosphoric acid, i.e., having a Ka greater than about $8 \times 10^{-3}$, especially the inorganic acids such as sulfuric acid, hydrochloric acid, nitric acid and the like. Ionization constant of an acid (Ka) as used herein refers to the dissociation of an acid electrolyte at room temperature, i.e. 25° C., and is equal to the product of the activities of each of the ions produced by the dissociation (if more than one ion of a given kind is produced, its activity is raised to the corresponding power) divided by the activity of the undissociated molecules with the activities assumed to be in their standard states at infinite dilution.

The following are representative of suitable amine extractants for use in the present invention.

Di-n-decylamine, $[CH_3(CH_2)_9]_2NH$;
Tri-n-octylamine, $[CH_3(CH_2)_7]_3N$;
Methyltrioctylammonium hydroxide,
  $[[CH_3(CH_2)_7]_3(CH_3)N]^+OH^-$;
Methyldioctylamine, $[CH_3(CH_2)_7]_2(CH_3)N$;
Dimethyldioctyl ammonium hydroxide,
  $[[CH_3(CH_2)_7](CH_3)_2N]^+OH^-$;
Di-n-dodecylamine, $[CH_3(CH_2)_{11}]_2NH$;
Tri-n-dodecylamine, $[CH_3(CH_2)_{11}]_3N$;
dimethyldidodecyl ammonium hydroxide,
  $[[CH_3(CH_2)_{11}]_2(CH_3)_2N]^+OH^-$;
Tricaprylyl amine, $R_3N$ where R is a mixture of $C_8H_{17}$ and $C_{10}H_{21}$ but predominantly $C_8H_{17}$;
Tri-iso-octyl amine, $[CH_3(CH_2)_7]N$ where $C_8H_{17}$ groups are comprised of mixed isomers;
N,N-didodecenyl-N-n-butyl amine, $(C_4H_9)(C_{12}H_{23})_2N$;
N-dodecenyl-N-trialkylmethyl amine,
  $(C_{12}H_{23})(R_1R_2R_3C)NH$ where $R_1+R_2+R_3$ equal $C_{11}H_{23}$ or $C_{14}H_{29}$;
N-lauryl-N-trialkylmethyl amine,
  $(C_{12}H_{26})(R_1R_2R_3C)NH$ where $R_1+R_2+R_3$ equal $C_{11}H_{23}$ or $C_{14}H_{29}$;
Tricoco amine, $R_3N$ where R is a mixture of 15% $C_8H_{17}$ or $C_{10}H_{21}$, 48% $C_{12}H_{25}$, 18% $C_{14}H_{29}$, 9% $C_{16}H_{33}$, 10% $C_{18}H_{37}$ (stearyl-oleyl);
Tri lauryl amine, $R_3N$ where R is a mixture of 88% $C_{12}H_{26}$; 10% $C_{14}H_{29}$ isomers, 2% $C_{10}H_{21}$;
Di-n-decyl ammonium sulfate,
  $2[[CH_3(CH_2)_9]_2NH]-H_2SO_4$;
Tri-n-octylammonium chloride,
  $[CH_3(CH_3)_7]_3N-HCl$;
Dimethyldioctyl ammonium chloride,
  $[[CH_3(CH_2)_7]_2(CH_3)_2N]^+Cl^-$;
Bis-methyltridodecylammonium sulfate,
  $[[CH_3(CH_2)_{11}]_3NCH_3]_2SO_4=$;
Dimethyldidodecyl ammonium chloride,
  $[[CH_3(CH_2)_{11}]_2(CH_3)_2N]^+Cl^-$;
Tricaprylyl amine sulfate, $2(R_3N) \cdot H_2SO_4$ where R is a mixture of $C_8H_{17}$ and $C_{10}H_{21}$ but predominantly $C_8H_{17}$;
Tricaprylyl amine bisulfate, $R_3N \cdot HSO_4$ were R is a mixture of $C_8H_{17}$ and $C_{10}H_{21}$ but predominantly $C_8H_{17}$.

Although the amines are capable of extracting when in the undiluted liquid form it is preferred that they be utilized in conjunction with an organic diluent for greater ease in handling and extracting control. In general, organic diluents which are suitable for use in the present invention are organic solvents in which the amines are quite soluble and, in addition, are substantially water insoluble. A wide range of organic solvents are effective including kerosene, mineral spirits, naphtha, benzene, xylene, toluene, nitrobenzene, carbontetrachloride, chloroform, trichloroethylene and the like.

In general, any proportion of the amine to organic diluent can be used, however, relatively high proportions on a volume basis of the amine to organic diluent results in a relatively viscous extractant which is difficult to use for extraction while relatively low proportions on a volume basis results in the necessity for using unduly large volumes of the extractant. In most instances, amounts of the amines which are particularly well suited for use in the organic diluent are between about 1% and 80% by volume. In general, the amount of the extractant necessary to be contacted with the wet phosphoric acid is dependent, inter alia, on the temperature and concentration of the wet phosphoric acid, as well as the equilibrium distribution between the phosphoric acid in the aqueous phase and the phosphoric acid in the extractant phase. Because the amines vary in degree of extraction as well as being influenced by the particular organic diluent used it should be noted that preferably only amounts of the extractant which are sufficient to remove the phosphoric acid should be used. The preferred amounts can be readily determined by conducting equilibrium distribution tests on the particular wet phosphoric acid as well as the particular extractant to be used in order to determine the degree of extraction which is desired.

In some instance it is highly desirable to add minor amounts of suitable additives to increase the solubility of the amine compounds in certain organic solvents. Additives which have been especially effective as solubilizing agents are, in general, water-insoluble alcohols which are soluble in the organic diluent and preferably are monohydric higher aliphatic alcohols containing about 6 to about 20 carbon atoms; especially preferred are the primary alcohols containing not more than 15 carbon atoms. For example, tricaprylyl amine bisulfate, about 10% by total volume, is rendered more soluble in kerosene by the addition of about 5% by total volume of n-decyl alcohol as an additive. Suitable alcohols include 1-hexanol, 4-methyl-2-pentanol, 2-ethyl-1-butanol, 2-heptanol, 1-octanol, 2-octanol, 5-ethyl-2-nonanol, 1-dodecanol, 1-tetradecanol, and the like.

The extraction process, as well as the stripping or removal process, can be carried out in a batch operation in which case it may be necessary to repeat the extraction or stripping until the desired advantageous degree of extractoin or stripping is reached. However, the process may be carried out in a continuous operation, with countercurrent contact of the different phases, or in any other continuous manner.

After the organic amine extractant has extracted the phosphoric acid into the extractant phase, the phosphoric acid can be removed therefrom as phosphate values, i.e. either as phosphoric acid and/or phosphate salts, by stripping the phosphate values from the amine extractant with a stripping agent. Stripping agents which are suitable include gases, such as anhydrous ammonia, which can be utilized by being bubbled through the extractant phase to precipitate the phosphate values, as for example, ammonium phosphates, such as mono- or di-ammonium phosphate, as well as stripping solvents.

In general, the stripping solvents suitable for use are those which are capable of stripping phosphate values from the amine extractant. In most cases, aqueous stripping solvents are preferred, such as, water and basic, acidic or neutral aqueous solutions. In some cases the stripping mechanism appears to be a solubility mechanism such as the use of water as a stripping agent in which the phosphate value is more soluble than in the amine extractant; while in other cases the stripping mechanism appears to be an anion exchange mechanism such as the use of an acidic aqueous solution of hydrochloric acid in which the stripping mechanism is believed to be represented by the following:

$[R_3N \cdot H_3PO_4]$ complex $+ HCl \rightarrow$
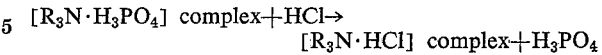
$[R_3N \cdot HCl]$ complex $+ H_3PO_4$ In addition, the choice of the stripping solvent is governed to a large extent by the type of phosphate values desired to be recovered in the strip liquor and, in general, for use in stripping phosphate salts an aqueous solution containing any metal source can be used. In particular, for use in stripping phosphate salts as the phosphate values are those alkali metal, ammonium and alkaline earth metal sources which are capable of yielding the desired alkali metal, ammonium or alkaline earth metal cation in the aqueous solvent. Such alkali metal sources include the salts, oxides and hydroxides, such as $Na_2CO_3$, $NaHCO_3$, $NaCl$, $NaH_2PO_4$, $Na_2HPO_4$, $Na_3PO_4$, $NaOH$, $Na_2O$, $Na_2SO_4$, $NaNO_3$, $K_3CO_3$, $KCl$, $KNO_3$ $KOH$, $K_2O$, $Li_2CO_3$, $LiCl$, $LiNO_3$, $Li_2SO_4$ and the like, including mixtures thereof. Although alkali metal sources of cesium and rubidium can, in some cases, be used in practicing this invention, since they are relatively expensive and are not readily available they are not believed to offer the advantages for use as the foregoing alkali metal sources. In addition, such ammonium sources include $NH_3$, $(NH_4)_2CO_3$, $(NH_4)HCO_3$, $(NH_4)H_2PO_4$ $(NH_4)_2HPO_4$, $(NH_4)_2SO_4$, $NH_4Cl$ and the like, including mixtures of these. Further, the alkaline earth metal sources include salts, oxides and hydroxides, such as $CaCO_3$, $CaCl_2$, $Ca(OH)_2$, $CaO$, $Ca(NO_3)_2$, $CaH_2PO_4$, $MgO$, $MgCO_3$, $MgCl_2$, $Mg(NO_3)_2$ and the like, including mixtures of these. Although the alkaline earth metal sources of strontium and barium can, in some cases, be used in practicing this invention, since they are relatively expensive and are not readily available they are not believed to offer the advantages for use as the foregoing alkaline earth metal sources. Further, aqueous stripping solvents containing other metal salts can be used which include aluminum hydroxide, and aluminum salts, such as aluminum sulfate, aluminum chloride, aluminum nitrate and the like as well as other heavy metal salts. In addition, mixtures of all of the foregoing metal sources can be used, for example, a mixture of calcium and aluminum salts, sodium and aluminum salts and the like. For use in stripping phosphoric acid as the phosphate value are aqueous solvents consisting essentially of water or an acidic aqueous solution of an acid which is stronger than phosphoric, i.e. having a Ka greater than about $8 \times 10^{-3}$, and which includes such inorganic acids as hydrochloric acid, sulfuric acid, nitric acid and the like. The amounts of the aqueous stripping solvent which are suitable depend upon, inter alia, degree of phosphate value removal desired, particular amine and stripping solvent used, and the like and can readily be determined by conducting equilibrium distribution tests on the particular stripping solvent, amine and complexing agent to be used.

Still further advantageous results can be obtained that is, obtaining phosphate values purified with respect to iron impurities, by stripping the phosphate values from the amine extractant in the presence of an iron-complexing agent. The iron is complexed in the amine extractant and retained therein during the stripping by the complexing agent. Such complexing agents which are suitable are, in general, those which form an iron complex, believed to be an anionic iron complex, which has greater affinity for the amine extractant phase than for the stripping solvent phase. In particular are the anionic complexing agents of the unidentate ligand class such as the halogen anions (fluoride, chloride and bromide) and the cyanide anion and the multidentate ligand class such as the bidentate and tridentate complexing ligands as well as the chelate ligand class, that is, a ligand capable of complexing the iron through two or more coordinating atoms. Such multidentate anionic complexing agents include the polyphosphate anions, that is, anions of phosphate polymers, such as pyrophosphate, tripolyphosphate, tetrapolyphosphate, hexametaphosphate (usually a mixture of phosphate polymers averaging from about 6 to about 60 phosphorus atoms in chain length) and the like; anions of the alkylene polyamine carboxylic acid type, such as ethylenediamine tetra-acetic acid, hexamethylene diamine-tetra-acetic acid, and the like; anions of the amine polycarboxylic acid type such as nitrilo triacetic acid, nitrilo diacetic acid and the like; anions of the alkylene diphosphonic acids and the hydroxy substituted alkylenediphosphonic acids such as methylene diphosphonic acid, ethylene diphosphonic acid, 1-hydroxyethylidene diphosphonic acid, and the like; anions of the amine polyalkylene phosphonic acids such as amino tri(methylphosphonic acid), amino di(methylphosphonic acid) and the like; and anions of the hydroxy carboxylic acids such as lactic, citric, tartaric, gluconic, arabonic, galactonic, 2-ketogluconic, saccharic, mucic, gluco-heptonic acids and the like. Because of the relative inexpensiveness as well as ready availability of the polyphosphate anions, they are preferred with the anions of pyrophosphate and tripolyphosphate being particularly preferred, especially the anion of tripolyphosphate. Amounts of the complexing agents which are suitable depend upon, inter alia, degree of iron contamination of the phosphoric acid, degree of iron removal desired and ability of complexing agent to complex the iron in the amine extractant phase, and can be readily determined by conducting equilibrium distribution tests on the particular complexing agent, amine extractant and stripping solvent to be used.

In addition, the complexing agent can be added to the phosphoric acid or to the amine extractant prior to contact of the extractant with the phosphoric acid, to the amine extractant after the iron and phosphoric acid have been extracted into the amine phase and/or to the stripping solvent prior to the stripping operation. It is usually desirable, for process simplification, to add the complexing agent to the stripping solvent prior to the stripping operation but in any event the iron should be complexed in the amine extractant while the phosphate values are being stripped from the extractant.

A typical embodiment of the process of the present invention for purifying phosphoric acid with respect to trivalent iron impurities is by first passing the phosphoric acid containing trivalent iron impurities through a bed of powdered iron in excess amounts over about 50% for a contact time of from about 2 minutes to about 240 minutes, and thereafter passing the phosphoric acid containing iron impurities in a reduced state to an extractor wherein the phosphoric acid is contacted with an organic amine extractant in from about 20 to 80% by volume in an organic diluent, whereby the phosphoric acid is separated from the iron impurities by being extracted into the organic amine extractant, separating the loaded extractant phase from the iron impurity phase and stripping the phosphoric acid, as phosphate values, from the organic amine extractant phase.

If further separation of iron impurities from phosphoric acid contained in an organic amine extractant phase is desired, a polyphosphate, such as tetrasodium pyrophosphate, tetrapotassium pyrophosphate, sodium tripolyphosphate, potassium tripolyphosphate and the like can be used as the complexing agent and an aqueous sodium hydroxide and/or sodium carbonate solution as the stripping solvent. Preferably the amine extractant phase containing the phosphoric acid and iron is from about 20 to 80% by weight in the organic diluent. In general, the complexing agent should preferably be used in amounts based on the degree of iron in the extractant in a weight ratio of complexing agent to iron of at least about 4:1 and preferably about 8:1 to about 40:1. Weight ratios above 40:1 and as high as 100:1 and higher can be used but are not usually desirable since such amounts do not appear to increase the complexing efficiency of the complexing agent. The aqueous sodium hydroxide and/or sodium carbonate solution should preferably be from about 5 to about 50% by weight concentration and contain enough sodium to remove from about 50% to as high as 95% by weight of phosphoric acid from the amine extractant based on the removal of the phosphate values as monosodium orthophosphate. In this connection it is preferred for optimum process results to keep the aqueous strip liquor phase in equilibrium with the amine extractant phase below about a pH of 3 in order to aid the complexed iron to remain in the amine extractant phase. Although temperatures can be varied, it is preferred that temperatures from about 25° C. to about 100° C. be maintained during the process. Temperatures, such as about 30 to 85° C., appear to aid in handling and controlling the amine extractant phase and are, therefore, especially preferred.

The sodium phosphate strip liquor can then be further processed as is well known in the art to such useful phosphate salts as mono-, di- and tri-sodium phosphates, sodium pyrophosphates, sodium tripolyphosphates, sodium trimetaphosphates and the like, as well as to phosphoric acid by various methods such as processing through cation exchange resins.

The foregoing process with respect to the use of the complexing agent also enables the use of a simple and advantageous method for stripping the amine extractant containing the complexed iron in order to regenerate the amine extractant as well as to recover the iron and polyphosphate anion complexing agent. In this respect, the polyphosphate anion complexing agent can be recycled, if desired, for further use as a complexing agent in the stripping solvent. In general, the stripped amine extractant, that is, the amine extractant containing the complexed iron can be further stripped with an aqueous basic solution of the same type as previously described as being suitable for use as the stripping solvent. This stripping operation regenerates the amine extractant, which, if desired, can be recycled to the extraction operation. For example, an alkali metal hydroxide or carbonate, preferably sodium hydroxide or sodium carbonate, in an aqueous solution of from about 5 to about 50% concentration can be used as the stripping solvent. The pH of the aqueous strip liquor phase in equilibrium with the amine extractant phase is preferably controlled between about 4 to 9.5 for best results in regenerating the amine extractant and keeping the complexed iron in the aqueous solution. The aqueous strip liquor from the amine regeneration step contains iron and polyphosphate anion complexing agent. The iron can be removed from this strip liquor by precipitation as the iron hydroxide by raising the pH of the aqueous strip liquor to about 11 to 12 by use of a strong base such as an alkali metal phosphate or hydroxide, and preferably sodium hydroxide, or trisodium phosphate. After removal of the iron precipitate by such means as filtration, the filtrate containing the polyphosphate complexing agent can, if desired, be recycled for use in the aqueous stripping solvent.

The following examples are presented for illustrative purposes with parts by weight being given unless otherwise indicated.

EXAMPLE I

In a four stage counter-current extractor a feed acid containing 481.2 g./l. of $H_3PO_4$ and 11.0 g./l. of iron (essentially as $Fe^{+++}$) was contacted with an extractant comprised of about 25% by volume of tricaprylyl amine in a light aromatic petroleum fraction. The flow rates used in the extractor were about 4.7 mls./min. for the entering feed acid and about 17.0 mls./min. for the entering extractant. The following table presents the results of analyses of the exiting extractant for $H_3PO_4$ and iron (both as $Fe^{++}$ and $Fe^{+++}$) contained therein, with the analyses made hourly over a 6 hour period.

TABLE 1

| | Extractant | |
|---|---|---|
| | $H_3PO_4$ conc. (g./l.) | Iron conc. (g./l.) |
| Analyses: | | |
| 1 | 96.5 | 2.12 |
| 2 | 92.6 | 2.23 |
| 3 | 93.1 | 2.23 |
| 4 | 90.2 | 2.35 |
| 5 | 92.1 | 2.12 |
| 6 | 93.1 | 2.35 |

A feed acid containing about 541.5 g./l. $H_3PO_4$ and 13.9 g./l. iron (essentially as $Fe^{+++}$) was contacted with about 100% excess iron (powdered) and then analyzed for $H_3PO_4$, $Fe^{+++}$ and $Fe^{++}$; with the results; 541.5 g./l. $H_3PO_4$, substantially no $Fe^{+++}$, 19.7 g./l. $Fe^{++}$. This feed acid was contacted in a four stage counter-current extractor with an extractant comprised of about 25% by volume of tricaprylyl amine in a light aromatic petroleum fraction. The flow rates used in the extractor were about 46.0 mls./min. for the entering extractant and 11.5 mls./min. for the entering acid. The following table presents the results of analyses of the exiting extractant for $H_3PO_4$ and iron (both as $Fe^{++}$ and $Fe^{+++}$) contained therein, with the analyses made at the beginning and end of a 2 hour period.

TABLE 2

| | Extractant | |
|---|---|---|
| | $H_3PO_4$ conc. (g./l.) | Iron conc. (g./l.) |
| Analyses: | | |
| 1 | 73.0 | 0.19 |
| 2 | 73.5 | 0.17 |

A feed acid containing about 783.1 g./l. $H_3PO_4$ and 13.9 g./l. iron (essentially as $Fe^{+++}$) was contacted with about 100% excess iron (powdered iron) and then analyzed for $H_3PO_4$, $Fe^{+++}$ and $Fe^{++}$, with the results: 783.1 g./l. $H_3PO_4$, substantially no $Fe^{+++}$, 19.7 g./l. $Fe^{++}$. This feed acid was contacted in a five stage counter-current extractor with an extractant comprised of about 50% by volume of tricaprylyl amine in a light aromatic petroleum fraction. The flow rates used in the extractor were about 4.8 mls./min. for the entering feed acid and about 16.0 mls./min. for the entering extractant. The following table presents the results of analyses of the exiting extractant for $H_3PO_4$ and iron (both as $Fe^{++}$ and $Fe^{+++}$) contained therein, with the analyses made at the beginning and end of a 1 hour period.

TABLE 3

| | Extractant | |
|---|---|---|
| | $H_3PO_4$ conc. (g./l.) | Iron conc. (g./l.) |
| Analyses: | | |
| 1 | 187.2 | 0.26 |
| 2 | 183.8 | 0.24 |

As can be observed from the above tables, the amount of iron contained in the extractant from unreduced wet phosphoric acid (Table 1) was significantly greater than the amount of iron contained in the extractant from reduced wet phosphoric acid (Tables 2 and 3). Table 1 indicates an iron content of about 2.3% in the unreduced wet acid and an iron content of about 2.3% in the phosphoric acid extracted into the extractant. Tables 2 and 3 indicate an iron content of about 2.5% in the unreduced feed wet phosphoric acid and an iron content of about 0.2% (Table 2) and 0.13% (Table 3) in the phosphoric acid extracted into the extractant.

EXAMPLE II

In this example, several metals, as indicated, were contacted in amounts as indicated with 20 ml. of feed acid containing 541.5 g./l. of $H_3PO_4$ and 13.9 g./l. or iron (essentially as $Fe^{+++}$) for a period of from about 2–15 minutes. The feed acid was then batch extracted with 100 ml. of extractant comprised of about 25% by volume of tricaprylyl amine in a light aromatic petroleum fraction. The following table presents the results of analyses of the loaded extractant for $H_3PO_4$ and iron (both as $Fe^{++}$ and $Fe^{+++}$) contained therein.

TABLE 4

| | Metal/$Fe^{+++}$ Mole basis | Extractant | |
|---|---|---|---|
| | | $H_3PO_4$ conc. (g./l.) | Iron conc. (g./l.) |
| Metal: | | | |
| (1) Magnesium | 0.5 | 60.4 | 1.18 |
| (2) Aluminum | 0.33 | 59.5 | 0.78 |
| (3) Copper | 0.5 | 58.8 | 0.40 |
| (4) Iron | 0.5 | 59.6 | 0.28 |

EXAMPLE III

In this example 20 ml. of feed acid containing 541.5 g./l. $H_3PO_4$ and 13.9 g./l. iron (essentially as $Fe^{+++}$) was contacted with amounts of powdered iron as indicated and then batch extracted with 100 ml. of extractant as indicated. The following table presents the results of analyses of the loaded extractant for $H_3PO_4$ and iron (both as $Fe^{++}$ and $Fe^{+++}$) contained therein.

TABLE 5

| Extractant | Percent Excess Iron | $H_3PO_4$ conc. (g./l.) | Iron conc. (g./l.) |
|---|---|---|---|
| (1) 25% by volume of tricaprlyly amine in solvent. | 0 | 54.4 | 0.47 |
|  | 10 | 53.7 | 0.40 |
|  | 25 | 52.7 | 0.33 |
|  | 50 | 53.3 | 0.21 |
| (2) 50% by volume of tricaprylyl amine in solvent. | 0 | 64.9 | 0.18 |
|  | 10 | 64.1 | 0.14 |
|  | 25 | 73.5 | 0.13 |
|  | 50 | 74.9 | 0.13 |
| (3) 40% by volume of N-dodecenyl-N-trialkyl methyl amine (alkyl totals 11 to 14 carbon atoms) in solvent. | 0 | 70.4 | 0.17 |
|  | 10 | 70.1 | 0.11 |
|  | 25 | 65.9 | 0.11 |
|  | 50 | 63.7 | 0.10 |

Note.—Solvent, light aromatic petroleum solvent.

EXAMPLE IV

In a laboratory size electrolysis cell equipped with platinum electrodes connected to an 8-volt battery about 250 ml. of wet phosphoric acid containing about 11.3 g./l. iron (essentially as $Fe^{+++}$) was electrolyzed at about 350 ma. for about 8 hours. The anode was provided with a porous shield. A 20 ml. sample was taken from the cell in the vicinity of the cathode. Ten ml. of the sample was batch extracted with 35 ml. of an extractant comprised of about 50% by volume of tricaprylyl amine in a light aromatic petroleum fraction. The raffinate of the sample was analyzed for iron (both as $Fe^{++}$ and $Fe^{+++}$). The remaining 10 ml. from the sample (blank) was analyzed for iron (both as $Fe^{++}$ and $Fe^{+++}$). The following table presents the results of the analyses:

TABLE 6

|  | G./l. |
|---|---|
| Raffinate conc. | 9.51 |
| Blank conc. | 12.51 |

As can be observed from the above table, about 76% of the iron was not extracted into the extractant or, stated differently, the phosphoric acid recovered from the extractant contained less than 24% of the iron in the original wet phosphoric acid; a significant reduction in iron impurities.

EXAMPLE V

A phosphoric acid previously purified with respect to sulfate and fluoride impurities was fed (1) to an iron-reduction step where the phosphoric acid was contacted with an excess of powdered iron to reduce the trivalent iron impurities to the divalent oxidation state, the phosphoric acid containing the reduced iron impurities was passed (2) to an extractant step where it was contacted with an extractant comprised of about 50% by volume of tricaprylyl amine in a light aromatic petroleum fraction in a 3-stage counter-current extractor, the loaded extractant was passed (3) to a stripping step of a 2-stage counter-current extractor where it was contacted with a strip solvent comprised of an aqueous solution of sodium tripolyphosphate, sodium hydroxide, and sodium carbonate and the phosphate values obtained were passed (4) to a scrub step where they were scrubbed with an extractant comprised of about 50% by volume of tricaprylyl amine in a light aromatic petroleum fraction in a 2-stage counter-current extractor. A material balance made after 8 hours of continuous operation gave the indicated results in the following table.

TABLE 7

| Stream | Input | | | | | Output | | | | |
|---|---|---|---|---|---|---|---|---|---|---|
|  | Volume (mls.) | $H_3PO_4$ (g./l.) | $H_5P_3O_{10}$ (g./l.) | Na (g./l.) | Fe (g./l.) | Volume (mls.) | $H_3PO_4$ (g./l.) | $H_5P_3O_{10}$ (g./l.) | Na (g./l.) | Fe (g./l.) |
| (1) Iron Reduction Step, (a) phosphoric acid | 1,820 | 783 | 0 | 0 | 9.92 | 1,812 | 783 | 0 | 0 | 16.1 |
| (2) Extractant Step: |  |  |  |  |  |  |  |  |  |  |
| (a) phosphoric acid | 1,812 | 783 | 0 | 0 | 16.1 | 849 | 189 | 0 | 0 | 30.2 |
| (b) extractant | 5,835 | 0 | 0 | 0 | 0 |  | 199 | 0 | 0 | 0.32 |
| (3) Stripping Step: |  |  |  |  |  |  |  |  |  |  |
| (a) loaded extractant |  | 199 | 0 | 0 | 0.32 | 7,290 | 4.07 | 3.36 | 0 | 0.27 |
| (b) strip solvent | 6,755 | 6.32 | 7.24 | $^1$37.55 | 0 |  | 170.7 |  | 34.8 | 0.01 |
| (4) Scrub Step: |  |  |  |  |  |  |  |  |  |  |
| (a) scrub solvent | 1,470 | 0 | 0 | 0 | 0 |  | 60.5 |  | 0 | 0.029 |
| (b) phosphate values |  | 170.7 |  | 34.8 | 0.01 | 7,340 | 163.3 |  | 34.8 | 0.00032 |

$^1$ Na from $Na_5P_3O_{10}$, NaOH and $Na_2CO_3$.

As can be observed from the above table, about 85% by weight of the phosphoric acid was recovered from the impure phosphoric acid containing the iron impurities while the iron impurities were reduced from about 1.27% based on $H_3PO_4$ to about 2 p.p.m. based on $H_3PO_4$; a significant reduction with respect to iron impurities.

What is claimed is:

1. A process for purifying wet process phosphoric acid prepared by acidulation of phosphate rock with sulfuric acid with respect to iron impurities which comprises reducing trivalent iron impurities contained in said phosphoric acid to the divalent oxidation state and contacting said phosphoric acid containing said reduced iron impurties with a water-insoluble amine extratant in amounts sufficient to extract said phosphoric acid and form a water-insoluble extractant phase comprising said amine and said phosphoric acid.

2. The process of claim 1, wherein said amine extractant is characterized by containing a terminal polar nitrogen containing group and at least 2 hydrophobic substituent groups.

3. The process of claim 2, wherein said trivalent iron impurities contained in said phosphoric acid are reduced to the divalent oxidation state by metallic reducing agents selected from the group consisting of magnesium, aluminum, copper and iron.

4. The process of claim 3, wherein said metallic reducing agent is iron.

5. A process for purifying wet process phosphoric acid prepared by acidulation of phosphate rock with sulfuric acid with respect to iron impurities which comprises reducing trivalent iron impurities contained in said phosphoric acid to the divalent oxidation state and contacting said phosphoric acid containing said reduced iron impurities with a water-insoluble amine extractant having the following formula:

wherein $R_1$ and $R_2$ are members selected from the class consisting of saturated and ethylenically unsaturated aliphatic hydrocarbyl groups containing from about 7 to 15 carbon atoms and $R_3$ is a member selected from the class consisting of hydrogen, saturated and ethylenically unsaturated aliphatic hydrocarbyl groups containing from 1 to about 18 carbon atoms, in amouts sufficient to extract said phosphoric acid and form a water-insoluble extractant phase comprising said amine and said phosphoric acid.

6. The process of claim 5, wherein said amine extractant is dissolved in an organic diluent and additionally recovering from said water-insoluble extractant phase said phosphoric acid as phosphate values.

7. The process of claim 6, wherein said trivalent iron impurities contained in said phosphoric acid are reduced to the divalent oxidation state by metallic reducing agents selected from the group consisting of magnesium, aluminum, copper and iron.

8. The process of claim 7, wherein said metallic reducing agent is iron.

9. A process for purifying wet process phosphoric acid prepared by acidulation of phosphate rock with sulfuric acid with respect to iron impurities which comprises reducing trivalent iron impurities contained in said phosphoric acid to the divalent oxidation state and contacting said phosphoric acid containing said reduced iron impurities with a water-insoluble amine extractant having the following formula:

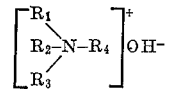

wherein $R_1$ and $R_2$ are members selected from the class consisting of saturated and ethylenically unsaturated aliphatic hydrocarbyl groups containing from about 7 to about 15 carbon atoms, $R_3$ is a member selected from the class consisting of saturated and ethylenically unsaturated aliphatic hydrocarbyl groups from 1 to about 18 carbon atoms, and $R_4$ is a member selected from the class consisting of saturated and ethylenically unsaturated aliphatic hydrocarbyl groups containing from 1 to about 15 carbon atoms, in amounts sufficient to extract said phosphoric acid and form a water-insoluble extractant phase comprising said amine and said phosphoric acid.

10. The process of claim 9, wherein said amine extractant is dissolved in an organic diluent and additionally recovering from said water-insoluble extractant phase said phosphoric acid as phosphate values.

11. The process of claim 10, wherein said trivalent iron impurities contained in said phosphoric acid are reduced to the divalent oxidation state by metallic reducing agents selected from the group consisting of magnesium, aluminum, copper and iron.

12. The process of claim 11, wherein said metallic reducing agent is iron.

13. A process of purifying wet process phosphoric acid produced by acidulation of phosphate rock with sulfuric acid with respect to iron impurities which comprises reducing trivalent iron impurities contained in said phosphoric acid to the divalent oxidation state with iron and contacting said phosphoric acid containing said reduced iron impurities with an extractant comprised of tricaprylyl amine dissovled in an organic diuent in amounts sufficient to extract said phosphoric acid and form a water-insoluble extractant phase comprising said amine and said phosphoric acid.

References Cited

UNITED STATES PATENTS

| | | | |
|---|---|---|---|
| 3,145,081 | 8/1964 | Surls et al. | 23—22 X |
| 3,310,374 | 3/1967 | Posey et al. | 23—165 |
| 3,361,527 | 1/1968 | Hinkebein et al. | 23—165 |

HERBERT T. CARTER, Primary Examiner

U.S. Cl. X.R.

23—312

PO-1050
(5/69)

UNITED STATES PATENT OFFICE
CERTIFICATE OF CORRECTION

Patent No. 3,479,139     Dated November 18, 1969

Inventor(s) Ernest L. Koerner, Jr.

It is certified that error appears in the above-identified patent and that said Letters Patent are hereby corrected as shown below:

Column 2, line 47, that portion of the formula reading "$2M^O+$" should read -- $2M.+$ --. Column 5, line 17, the formula written between the words "amine," and "where" now written as $[CH_3(CH_2)_7]N$" should read -- $[CH_3(CH_2)_7]_3N$ --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents